(12) United States Patent
Begay

(10) Patent No.: US 9,179,760 B2
(45) Date of Patent: Nov. 10, 2015

(54) ARTICULATED SUPPORT FOR MOBILE ELECTRONIC DEVICE

(71) Applicant: Faye Begay, Black River Falls, WI (US)

(72) Inventor: Faye Begay, Black River Falls, WI (US)

( * ) Notice: Subject to any disclaimer, the term of this patent is extended or adjusted under 35 U.S.C. 154(b) by 0 days.

(21) Appl. No.: 14/294,585

(22) Filed: Jun. 3, 2014

(65) Prior Publication Data

US 2014/0355139 A1 Dec. 4, 2014

Related U.S. Application Data

(60) Provisional application No. 61/830,627, filed on Jun. 3, 2013.

(51) Int. Cl.

| | |
|---|---|
| *G02B 7/02* | (2006.01) |
| *H04N 7/18* | (2006.01) |
| *A45F 5/00* | (2006.01) |
| *F16M 13/04* | (2006.01) |
| *F21V 21/088* | (2006.01) |
| *A45D 8/36* | (2006.01) |
| *F16M 11/04* | (2006.01) |
| *F16M 11/10* | (2006.01) |
| *F16M 11/20* | (2006.01) |
| *F16M 11/22* | (2006.01) |
| *F16M 11/24* | (2006.01) |
| *F16M 13/00* | (2006.01) |
| *F16M 13/02* | (2006.01) |
| *F21V 21/26* | (2006.01) |

(52) U.S. Cl.
CPC ... *A45F 5/00* (2013.01); *A45D 8/36* (2013.01); *F16M 11/041* (2013.01); *F16M 11/10* (2013.01); *F16M 11/2021* (2013.01); *F16M 11/22* (2013.01); *F16M 11/24* (2013.01); *F16M 13/00* (2013.01); *F16M 13/02* (2013.01); *F16M 13/04* (2013.01); *F21V 21/088* (2013.01); *G02B 7/02* (2013.01); *A45F 2005/002* (2013.01); *A45F 2200/0516* (2013.01); *F21V 21/26* (2013.01)

(58) Field of Classification Search
CPC .......... G02B 7/02; G02B 7/021; G02B 7/023; A45F 5/00
USPC .......... 359/811, 812, 815, 819, 822; 379/430; 348/126, 160

See application file for complete search history.

(56) References Cited

U.S. PATENT DOCUMENTS

| | | |
|---|---|---|
| 3,942,751 A | 3/1976 | Fay |
| D363,492 S | 10/1995 | Grussing |
| 7,508,932 B1 | 3/2009 | Bergh |
| 7,805,851 B2 | 10/2010 | Pettersson |
| 2011/0038064 A1* | 2/2011 | Xhunga ........................ 359/811 |

* cited by examiner

*Primary Examiner* — William Choi
(74) *Attorney, Agent, or Firm* — Robert Gray; The Gray Law Group, Ltd.

(57) ABSTRACT

An articulated support for a mobile phone, tablet, or other mobile electronic device provides an articulated arm. The articulated arm may be mounted on a floor stand or desktop stand. The device may be positioned at a point convenient to a reclining user. In alternate embodiments, the articulated arm may be supported by a wall mount, or by a headband worn by the user. The articulated arm may be modified by the user by adding or removing sections to change its length, or by changing its attachments for electronic devices.

19 Claims, 4 Drawing Sheets

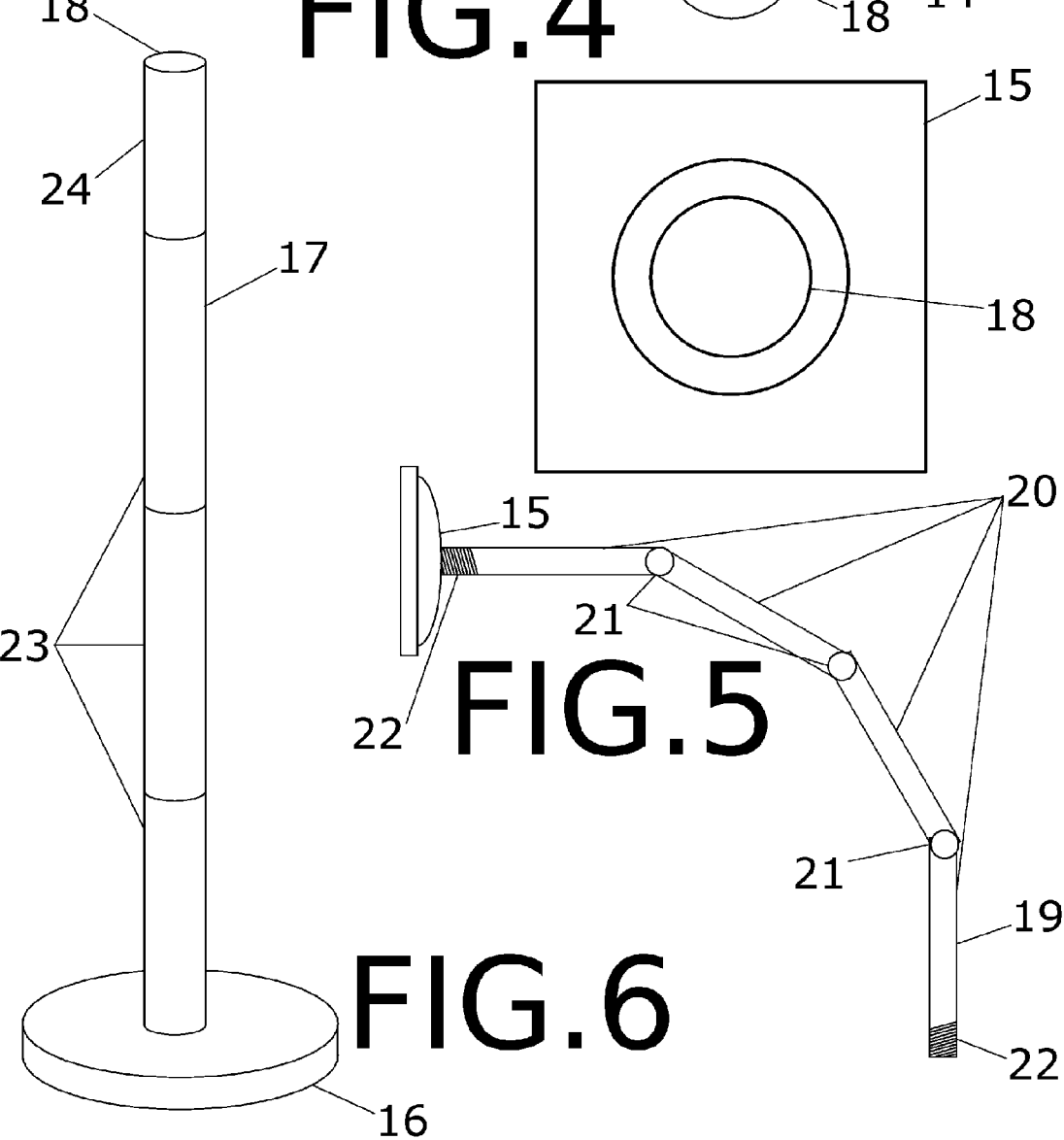

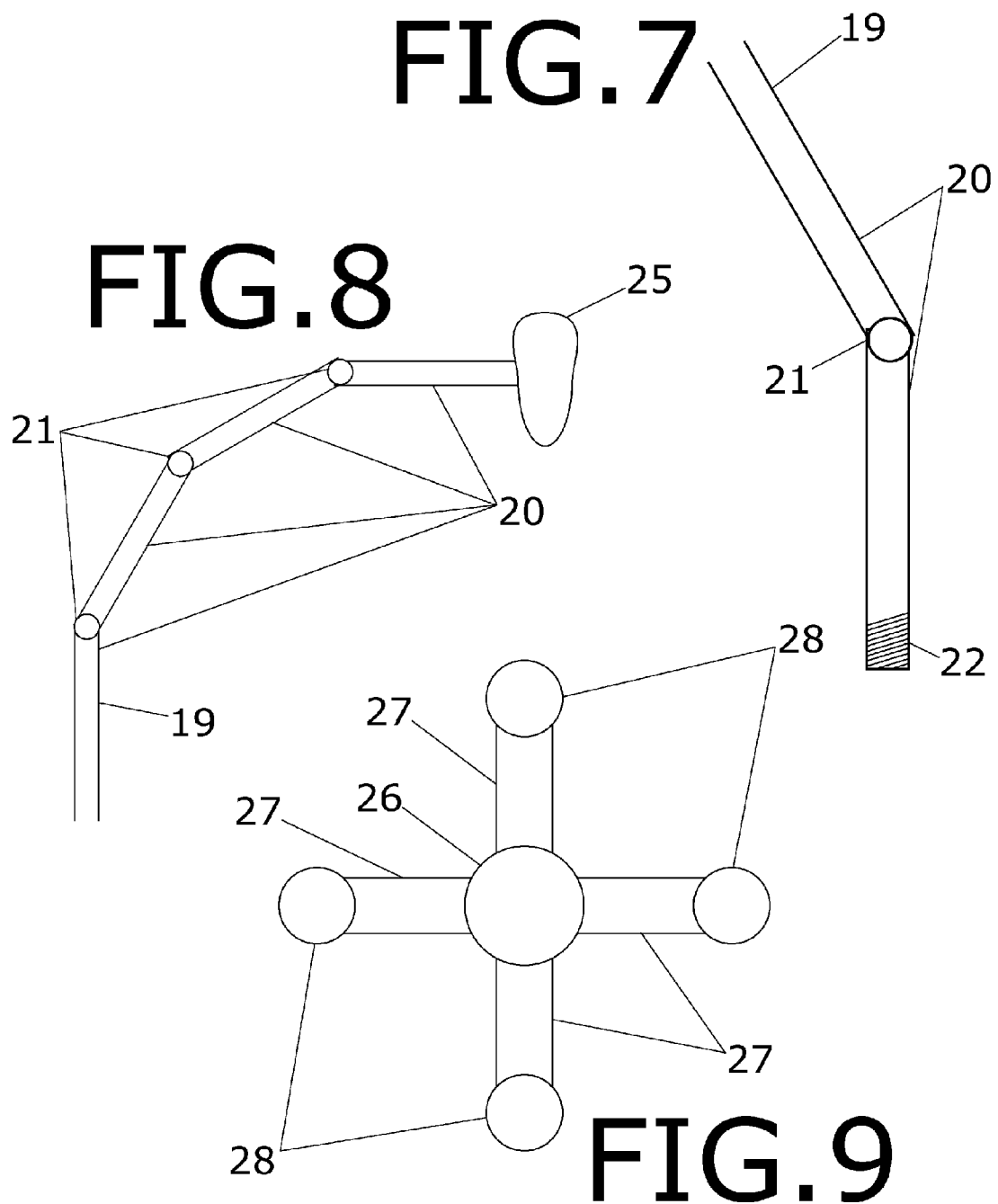

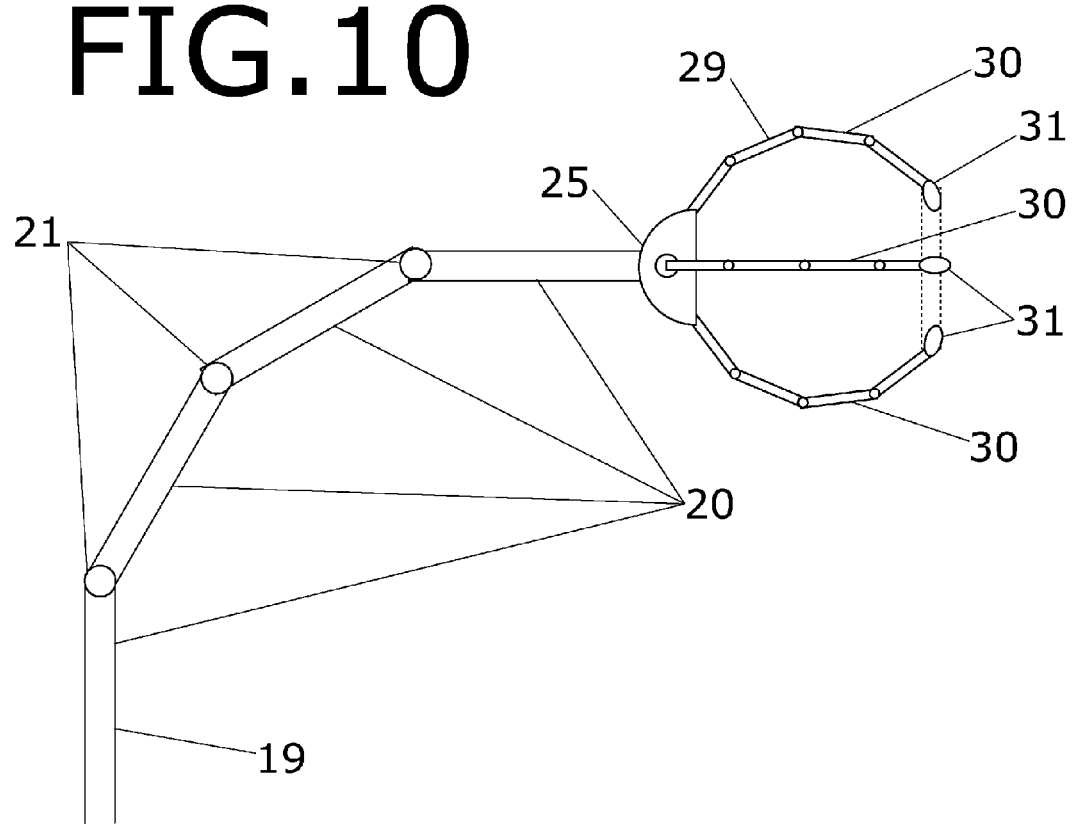

ARTICULATED SUPPORT FOR MOBILE ELECTRONIC DEVICE

CROSS-REFERENCE TO RELATED APPLICATIONS

This application claims priority to U.S. Provisional Application No. 61/830,627, filed Jun. 3, 2013.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to accessories for mobile electronic devices, and in particular to an articulated support for a mobile phone, tablet, or other portable electronic device. For many users, their smartphones, tablets, and other small, mobile electronic devices are essential. Unfortunately, the user may not have a hand free to hold such a device, and would appreciate the convenience of a hands-free support for the device. An articulated support for a mobile electronic device would resolve this problem. In a first exemplary embodiment, the arm may be mounted on a vertical floor stand or desktop stand. The device may be positioned at a point convenient to a reclining user. In alternate embodiments, the articulated arm may be supported by a wall mount, or by a headband worn by the user.

SUMMARY OF THE INVENTION

Accordingly, the invention is directed to an articulated support for a mobile phone, tablet, or other mobile electronic device. In a first exemplary embodiment, the arm may be mounted on a floor stand or desktop stand. The device may be positioned at a point convenient to a reclining user. In alternate embodiments, the articulated arm may be supported by a wall mount, or by a headband worn by the user. The articulated arm may be modified by the user by adding or removing sections to change its length, or by changing its attachments for electronic devices.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate three embodiments of the invention and, together with the description, serve to explain the principles of the invention.

FIG. 3 shows a front view of the headband component of the second exemplary embodiment, displaying the headband 13, the headband mount 14, and the threaded socket 18.

FIG. 4 shows a front view of the wall mount component of the third exemplary embodiment, displaying the wall mount 15, and the threaded socket 18.

FIG. 5 shows a side view of the wall mount and articulated arm components of the second exemplary embodiment, displaying the wall mount 15, the articulated arm 19, four arm segments 20, three hinges 21, and two threaded ends 22.

FIG. 6 shows a side perspective view of the floor stand component of the first exemplary embodiment, displaying the floor stand 16, the post 17, the threaded socket 18, three post segments 23, and the post top segment 24.

FIG. 7 shows a side view of a portion of the articulated arm component of the first exemplary embodiment, displaying the articulated arm 19, two arm segments 20, a hinge 21, and a threaded end 22.

FIG. 8 shows a side view of the articulated arm component of the first exemplary embodiment, displaying the articulated arm 19, four arm segments 20, three hinges 21, and the swivel mount 25.

FIG. 9 shows a front view of the tablet mount component of the first exemplary embodiment, displaying the center section 26, four adjustable members 27, and four large adjustable clamps 28.

FIG. 10 shows a side view of the articulated arm component and smartphone mount components of the first exemplary embodiment, displaying the articulated arm 19, four arm segments 20, three hinges 21, the swivel mount 25, the smartphone mount 29, three articulated fingers 30, and three small adjustable clamps 31.

DETAILED DESCRIPTION OF THE INVENTION

Figure 1:
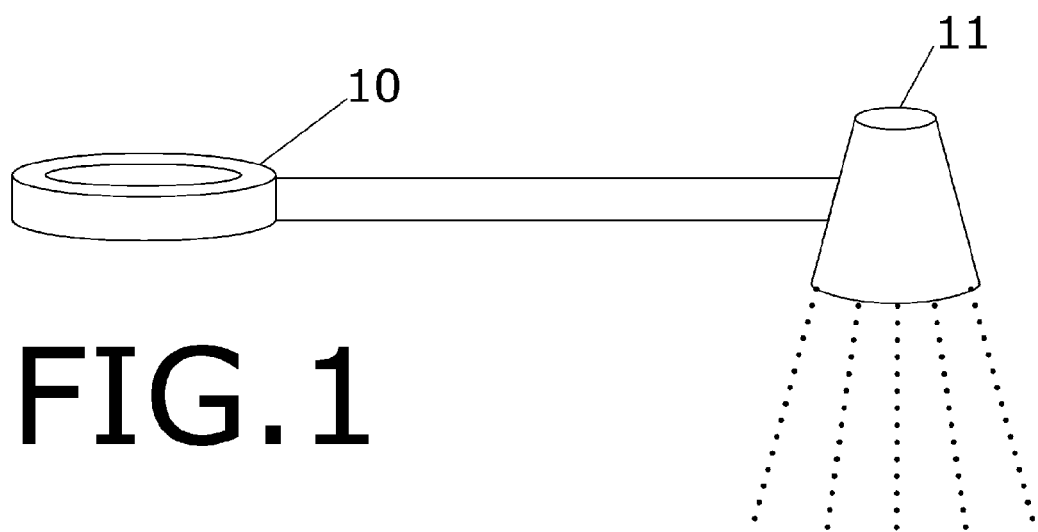
FIG. 1 shows a side view of the lamp component of the first exemplary embodiment, displaying the clamp 10, and the lamp 11.
Figure 2:
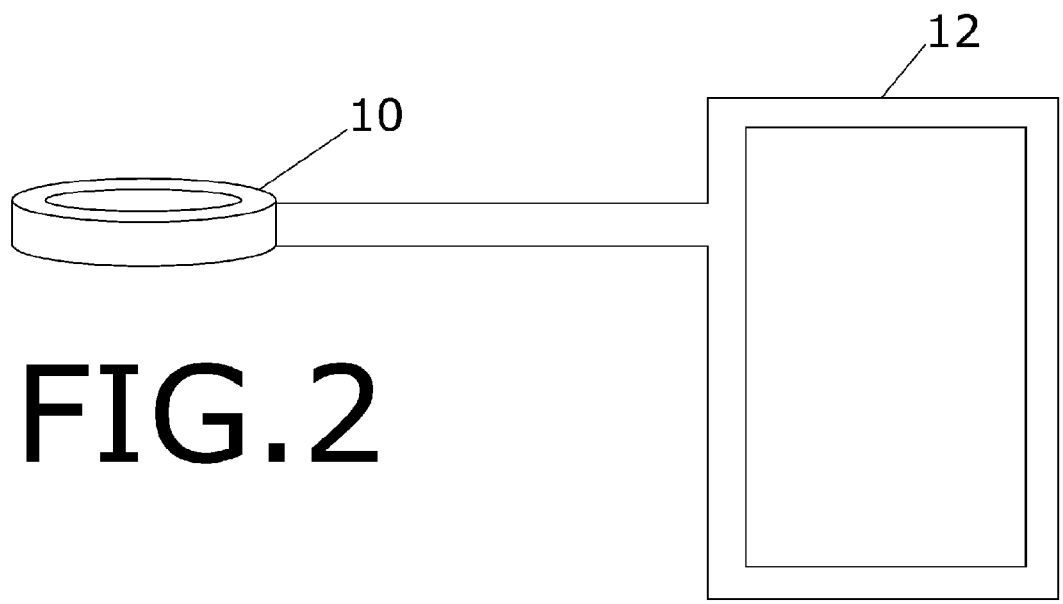
FIG. 2 shows a side view of the reading magnifier component of the first exemplary embodiment, displaying the clamp 10, and the reading magnifier 12.

Referring now to the invention in more detail, the invention is directed to an articulated support for a mobile phone, tablet, or other mobile electronic device. In a first exemplary embodiment, the articulated arm 19 may be mounted on a floor stand 16 or desktop stand. The device may be positioned at a point convenient to a reclining user. In a second exemplary embodiment, the articulated arm 19 may be supported by a headband 13 worn by the user. In a third exemplary embodiment, the articulated arm 19 may be supported by a wall mount 15 featuring an adhesive surface on its back. The articulated arm 19 may be modified by the user by adding or removing arm segments 20 to change its length, or by changing its attachments for electronic devices.

The articulated arm 19 also features a plurality of arm segments 20 and a plurality of hinges 21. For the first exemplary embodiment, each arm segment 20 would preferably be twelve inches in length. Ideally, four arm segments 20 and three hinges 21 will be provided. More or fewer hinges 21, and more or fewer arm segments 20, are contemplated; the number of hinges 21 is determined by the number of arm segments 20, minus one. Each end of each arm segment 20 features a threaded end 22, and each end of each hinge 21 features a threaded socket 18. The articulated arm 19 is assembled by the user by screwing a threaded end 22 on an arm segment 20 into a threaded socket 18 on a hinge 21, screwing a threaded end 22 on another arm segment 20 into the threaded socket 18 on the other end of the hinge 21, and adding hinges 21 and arm segments 20 in the same manner until the articulated arm 19 reaches the desired length. Each hinge 21 would preferably feature a knob which would temporarily lock it into position, once the user has the hinge 21 at its desired angle.

In each of the contemplated embodiments, the lower end of the articulated arm 19 is temporarily affixed to a mount or stand, which features a threaded socket 18. The lower end of the articulated arm 19 features a threaded end 22 on the arm segment 20, which is screwed into the threaded socket 18 on the mount or stand. The upper end of the articulated arm 19 features a swivel mount 25, which would preferably feature a ball-and-socket joint and a threaded socket 18 at each end. The first exemplary embodiment features a floor stand 16 and a post 17, which is composed of three post segments 23 and a post top segment 24. Each of the post segments 23 would preferably be twelve inches in length. The post top segment 24 would preferably be nine inches in length, and its upper end features a threaded socket 18, into which the lower end of the articulated arm 19 is affixed.

The floor stand 16 is preferably large and heavy, providing a secure base so that the entire device is stable, and difficult to knock over. The post segments 23 and top post segment 24 are preferably affixed to each other, and to the floor stand 16, with threaded connections of a larger diameter than the threaded socket 18 and threaded ends 22. A smaller version of the first exemplary embodiment is contemplated, featuring a smaller, lighter desktop stand rather than the floor stand 16. The desktop version would include only the post top segment 24, without the post segments 23; the arm segments 20 would be eight inches in length, and all other components would be scaled down accordingly.

The second exemplary embodiment features a headband component. The headband component features a headband mount 14, which may be secured to the user's head using the headband 13. The headband 13 would be provided in four different sizes. Two different versions of the headband 13 are contemplated. The first version is semi-rigid with a gap of approximately one inch at the back of the head, and would be secured in place by flexibility and friction. The second version is a flexible fabric strap, and would be secured in place with a fastener, such as a snap or a hook-and-loop fastener. At the center of the headband mount 14 is a threaded socket 18 for attachment of the articulated arm 19. Unlike the floor stand 16 of the first exemplary embodiment, all components of the second exemplary embodiment would be designed for lighter weights, to reduce exertion of the user's neck muscles. The arm segments 20 would be four inches in length, and all other components would be scaled down accordingly.

The third exemplary embodiment features a wall mount component. The wall mount 15 features a threaded socket 18 at its center for the articulated arm 19, and hook-and-loop fasteners to affix the wall mount 15 to the user's wall or ceiling. Components of the articulated arm 19 would be sized the same as those of the desktop version of the first exemplary embodiment.

Other components of each embodiment would preferably include a reading magnifier component and a lamp component. Each of these two components would preferably feature a swivel mount and a clamp 10 to affix the component to the articulated arm 19. Alternate embodiments, replacing each clamp 10 with a simple ring that would fit between an arm component 20 and a hinge 21, are also contemplated. The reading magnifier component would feature a reading magnifier 12: a rectangular magnifying glass mounted in a frame. The reading magnifier 12 may feature small, battery-powered light emitting diodes (LEDs) for illumination. The lamp component would feature a battery-powered lamp 11, which may be a larger LED, or a standard incandescent bulb similar to a flashlight bulb.

Additional components of each embodiment would preferably include two types of device mounts: a tablet mount component, and a smartphone mount component. The tablet mount component would preferably feature a center section 26, four adjustable members 27, and four large adjustable clamps 28. The center section 26 would feature a threaded end 22, to be affixed to the threaded socket 18 of the swivel mount 25 on the articulated arm 19. The four adjustable members 27 would telescope in and out to accommodate tablets of various sizes, and lock into position. The large adjustable clamps 28 would preferably be affixed temporarily to the center of each side of the user's tablet.

The smartphone mount component would preferably feature a center section 26 and four articulated fingers 30, each terminating in a small adjustable clamp 31. The articulated fingers 30 would be structured similarly to the articulated arm 19, but with segments and hinges that are permanently affixed to one another. The small adjustable clamps 31 would preferably be affixed temporarily to the center of each side of the user's smartphone, or similar small electronic device. The user would be capable of mounting either the smartphone mount component or the tablet mount component on the swivel mount 25, as desired. Both the tablet mount component and the smartphone mount component would be capable of use in conjunction with the light component, the reading magnifier component, or both.

To use the first exemplary embodiment, the user assembles the floor stand 16 and post 17, using as many post segments 23 as necessary to achieve the desired height. The user then begins assembly of the articulated arm 19 by attaching an arm segment 20 to the top post segment 24, and attaching a hinge 21 to the arm segment 20. Additional arm segments 20 and hinges 21 are attached in alternating order, to achieve the desired length for the articulated arm 19, and terminating in an arm segment 20 and swivel mount 25. In any of the threaded joints of the articulated arm 19, the user may insert a reading magnifier component, a lamp component, or both. The user selects a tablet mount component or smartphone mount component to be attached to the swivel mount 25. If using the tablet mount component, the user adjusts the length of the adjustable members 27 as necessary to accommodate the size of the tablet, and attaches one adjustable member 27 to the center of each side of the tablet, using a large adjustable clamp 31. If using the smartphone mount component, the user attaches one articulated finger 30 to the center of each side of the smartphone, using a small adjustable clamp 31.

To use the second exemplary embodiment, the user puts the headband component on his head and adjusts the length of the headband 13 as necessary, for an ideal fit. Following the same procedure as the first exemplary embodiment, the user then assembles the articulated arm 19, with a device mount attached to the upper end on the swivel mount 25, and attaches the reading magnifier component, the lamp component, or both as desired. The user attaches the chosen electronic device to the device mount, puts the headband component on his head, and attaches the fully assembled articulated arm 19 to the headband mount 14.

To use the third exemplary embodiment, the user attaches the wall mount 15 to the user's wall or ceiling, using the hook-and-loop fasteners provided. Following the same procedure as the first exemplary embodiment, the user then assembles the articulated arm 19, with a device mount attached to the upper end on the swivel mount 25, and attaches the reading magnifier component, the lamp component, or both as desired. The user attaches the chosen electronic device to the device mount, and attaches the fully assembled articulated arm 19 to the wall mount 15.

The clamps 10, lamp 11, headband mount 14, wall socket 15, arm segments 20, hinges 21, swivel mount 25, center section 26, adjustable members 27, and articulated fingers 30 would preferably be manufactured from rigid, durable materials such as aluminum, steel, and high-impact plastic. The floor stand 16, post segments 23, and post top segment 24 would preferably be manufactured from rigid, durable metals with substantial mass, such as steel and lead. The headband 13 would preferably be manufactured from flexible, durable fabrics such as nylon or a cotton-polyester blend, or a slightly flexible, durable material such as high-impact plastic. The large adjustable clamps 28 and small adjustable clamps 31 would preferably be manufactured from flexible, durable materials such as rubber or silicone. Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. An articulated support system for a mobile electronic device comprising:
   (a) an articulated arm;
   (b) said articulated arm comprising a plurality of arm segments;
   (c) said plurality of arm segments being pivotably joined in a linear configuration by a plurality of hinges;
   (d) said articulated arm terminating on each end in a threaded end;
   (e) said threaded end being compatible with each of a plurality of threaded sockets;
   (f) each of said plurality of threaded sockets being affixed to any of the group of a post top segment, a wall mount, a headband mount, or a swivel mount;
   (g) said swivel mount being affixed to a releasable mounting means for releasably mounting a mobile electronic device.

2. The articulated support system for a mobile electronic device of claim 1 wherein said releasable mounting means for releasably mounting a mobile electronic device comprises a center section, said center section being adjustably linked to a plurality of adjustable members, each of said plurality of adjustable members terminating in a clamp.

3. The articulated support system for a mobile electronic device of claim 2 wherein said post top segment is removably affixed to a plurality of post segments to comprise a post, said post being affixed at its lower end to a floor stand.

4. The articulated support system for a mobile electronic device of claim 1 wherein said releasable mounting means for releasably mounting a mobile electronic device comprises a plurality of articulated fingers, each of said plurality of articulated fingers terminating in a clamp.

5. The articulated support system for a mobile electronic device of claim 4 wherein said post top segment is removably affixed to a plurality of post segments to comprise a post, said post being affixed at its lower end to a floor stand.

6. The articulated support system for a mobile electronic device of claim 1 wherein said post top segment is removably affixed to a plurality of post segments to comprise a post, said post being affixed at its lower end to a floor stand.

7. The articulated support system for a mobile electronic device of claim 1 wherein said wall mount is capable of being secured to a wall by any of the group of adhesives or hook-and-loop fabric.

8. The articulated support system for a mobile electronic device of claim 7 wherein said post top segment is removably affixed to a plurality of post segments to comprise a post, said post being affixed at its lower end to a floor stand.

9. The articulated support system for a mobile electronic device of claim 8 wherein said headband mount is affixed to a headband, said headband being capable of being worn on the head of a human user.

10. The articulated support system for a mobile electronic device of claim 9 wherein said releasable mounting means for releasably mounting a mobile electronic device comprises a center section, said center section being adjustably linked to a plurality of adjustable members, each of said plurality of adjustable members terminating in a clamp.

11. The articulated support system for a mobile electronic device of claim 10 further comprising a lamp affixed to a clamp; said clamp being configured so as to be releasably engageable about any of said plurality of arm segments.

12. The articulated support system for a mobile electronic device of claim 10 further comprising a reading magnifier affixed to a clamp; said clamp being configured so as to be releasably engageable about any of said plurality of arm segments.

13. The articulated support system for a mobile electronic device of claim 9 wherein said releasable mounting means for releasably mounting a mobile electronic device comprises a plurality of articulated fingers, each of said plurality of articulated fingers terminating in a clamp.

14. The articulated support system for a mobile electronic device of claim 9 further comprising a lamp affixed to a clamp; said clamp being configured so as to be releasably engageable about any of said plurality of arm segments.

15. The articulated support system for a mobile electronic device of claim 9 further comprising a reading magnifier affixed to a clamp; said clamp being configured so as to be releasably engageable about any of said plurality of arm segments.

16. The articulated support system for a mobile electronic device of claim 1 wherein said headband mount is affixed to a headband, said headband being capable of being worn on the head of a human user.

17. The articulated support system for a mobile electronic device of claim 16 wherein said post top segment is removably affixed to a plurality of post segments to comprise a post, said post being affixed at its lower end to a floor stand.

18. The articulated support system for a mobile electronic device of claim 1 further comprising a lamp affixed to a clamp; said clamp being configured so as to be releasably engageable about any of said plurality of arm segments.

19. The articulated support system for a mobile electronic device of claim 1 further comprising a reading magnifier affixed to a clamp; said clamp being configured so as to be releasably engageable about any of said plurality of arm segments.

* * * * *